United States Patent [19]
Moreau

[11] Patent Number: 5,821,832
[45] Date of Patent: Oct. 13, 1998

[54] SIGNAL TRANSMISSION CIRCUIT

[75] Inventor: Jean-Michel Moreau, Grenoble, France

[73] Assignee: SGS-Thomson Microelectronics S.A., Saint Genis, France

[21] Appl. No.: 756,019

[22] Filed: Nov. 26, 1996

[30] Foreign Application Priority Data

Nov. 30, 1995 [FR] France .................................. 95 14384

[51] Int. Cl.$^6$ .................................................. H03H 7/09
[52] U.S. Cl. ........................ 333/177; 333/172; 375/258
[58] Field of Search .................................. 333/172, 177, 333/181, 170, 171; 375/258

[56] References Cited

U.S. PATENT DOCUMENTS

| | | | |
|---|---|---|---|
| 2,794,866 | 6/1957 | Dert | 330/53 |
| 3,231,837 | 1/1966 | O'Meara | 333/177 X |
| 4,707,672 | 11/1987 | Duret et al. | 333/4 |

FOREIGN PATENT DOCUMENTS 836535  4/1952  Germany ................. 333/177

OTHER PUBLICATIONS

French Search Report from French Patent Application 95 14384, filed Nov. 30, 1995.

*Primary Examiner*—Robert J. Pascal
*Assistant Examiner*—Justin P. Bettendorf
*Attorney, Agent, or Firm*—Wolf, Greenfield & Sacks, P.C.

[57] ABSTRACT

A signal transmission circuit for transmitting signals having a wide frequency spectrum over a cable. The circuit includes an isolating transformer having a high pass filtering function; a low-pass filter, the input of the low pass filter being common with the input of the high pass filter; and means for summing the output voltages of the low-pass filter and the high-pass filter.

30 Claims, 3 Drawing Sheets

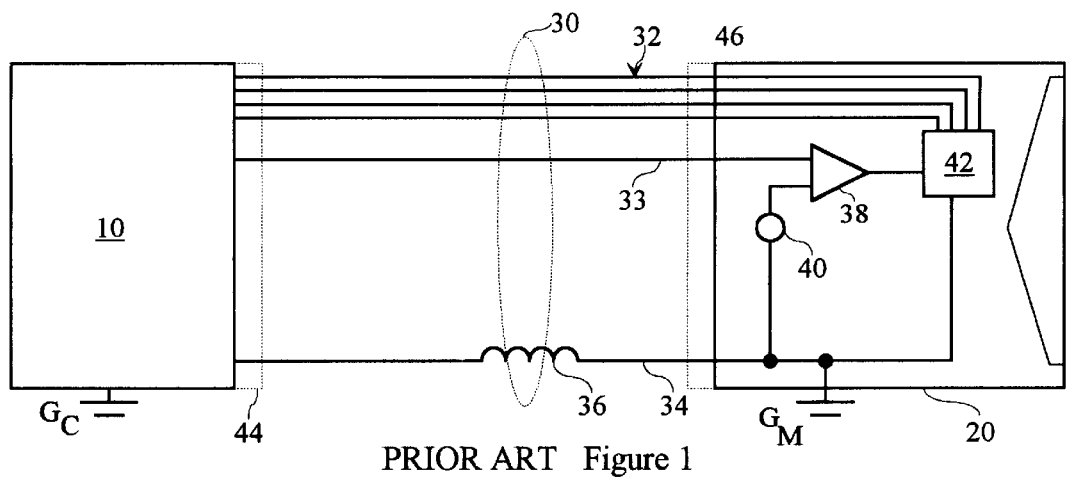
PRIOR ART  Figure 1
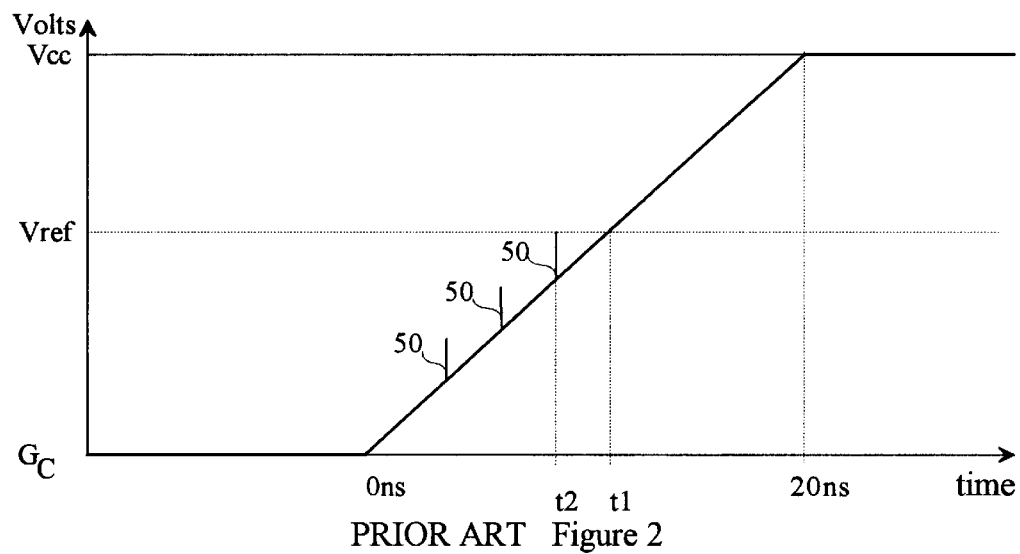
PRIOR ART  Figure 2
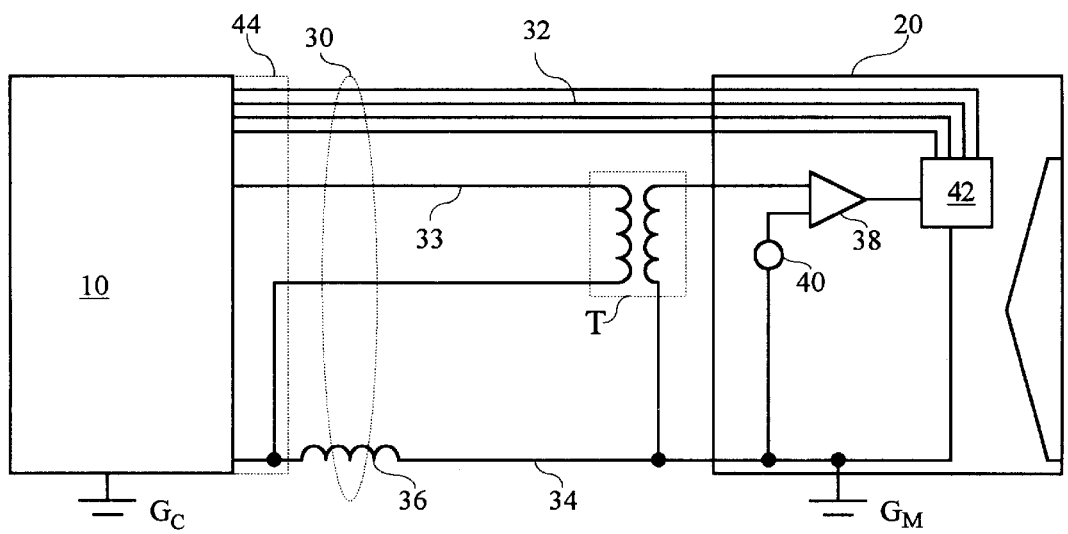
PRIOR ART  Figure 3

SIGNAL TRANSMISSION CIRCUIT

BACKGROUND OF THE INVENTION

1. Field of the Invention

The invention relates generally to circuits for carrying signals having a wide frequency spectrum, and more particularly, to cables carrying such signals.

2. Discussion of the Related Art

FIG. 1 shows a computer 10 connected to a monitor 20 by a cable 30. The cable typically contains several signal-carrying conductors 32. In particular, conductors 32 include a line synchronization conductor 33, and a common ground return conductor 34 connecting a ground $G_M$ of the monitor to a ground $G_C$ of the computer 10. The ground return conductor 34 possesses a parasitic inductance 36. Although present in all conductors, this is only shown in FIG. 1 for ground return conductor 34, as this parasitic inductance is of particular interest in the present invention. The line synchronization conductor 33 is connected to an input terminal of a voltage comparator 38. A second input terminal of the voltage comparator 38 is connected to an output terminal of a reference voltage generator 40.

The other conductors 32 communicate signals to a control circuit 42 within the monitor 20, which also receives an output signal from the comparator 38. The cable 30 is typically connected to the computer 10 with a plug and socket type connector 44, and to the monitor 20 with another connector 46. The signals transmitted through the cable 30 may include, for example, one or more video signals, line and frame synchronization pulses and voltage supply signals.

The line synchronization signal carried by conductor 33 and provided at the output of the voltage comparator 38 to the control circuit 42 contains pulses, the leading edge of which indicates the beginning of a line sweep. The polarity and length of the pulses carry other useful information. The timing of the leading edge must be accurate to within 1 ns, otherwise an unpleasant jittering of the image on the monitor 20 will result. To avoid such jittering, the line synchronization signal must be received by the control circuit 42 with accurate timing and without deformation.

In the cables currently used, return signals are transmitted by a conductor 34 connected at one end to the ground $G_C$ of the computer 10, and at the other end to the ground $G_M$ of the monitor. This ground return conductor 34 may carry a number of currents. The parasitic inductance 36 of the ground return conductor 34, in conjunction with these currents, causes voltage noise to occur between the ground of the computer 10 and the ground of the monitor 20. Often, this noise takes the form of sharp voltage spikes, caused by relatively large currents being switched in the computer 10 or in the monitor. For example, the line synchronization conductor 33 transmits a signal referenced to the ground $G_C$ of the computer, to the first input of comparator 38, whereas the comparator 38 and its second input are referenced to the ground $G_M$ of the monitor 20. As a result, the above voltage spikes appear to be added to the signals present on the line synchronization conductor 33.

FIG. 2 is a voltage-time plot showing the effect of these voltage spikes on the detection of a leading edge of a pulse in a line synchronization signal. The leading edge has a finite rise time, and appears as a ramp when magnified in the time dimension. The leading edge changes from ground voltage $G_C$ to Vcc. Detection of this leading edge is performed by comparator 38, in comparison with the value Vref 4, such as 3V, provided by the generator 40. For example, the leading edge may go from 0V to 5V in 20 ns. As shown in FIG. 2, this detection should normally be done at time t1, when the signal crosses the value Vref. If parasitic voltage peaks 50 are present on the signal, the crossing of Vref may be detected at a time t2 that is earlier than time t1. If the voltage peaks 50 are of 0.25V, the time t2 may occur 1 ns earlier than time t1. This will cause jitter of the image on the monitor 20.

A classical solution for similar problems has been to use an isolating circuit, such as a transformer, to transmit a sensitive signal between two distant circuits. However, for reasons provided below, this approach is not acceptable for the current application.

FIG. 3 shows a modification to the circuit of FIG. 1, wherein the line synchronization conductor 33 is connected to a terminal of a primary winding of a transformer T, which has its second terminal connected by a dedicated conductor to the ground $G_C$ of the computer 10. A first terminal of the secondary winding of the transformer T is connected to the first input of comparator 38. The other terminal of the secondary winding is connected to the ground $G_M$ of the monitor 20.

FIG. 4A shows exemplary line synchronization signals generated by computer 10. The line synchronization signals have either a rising leading edge as shown by signal 402, or a falling leading edge as shown by signal 404. If the transformer T is of high quality (and therefore expensive), and with good low frequency transmission, the comparator 38 receives signals 406 and 408 shown in FIG. 4B. Signals 406 and 408 correspond to signals 402 and 404, respectively. These signals from the secondary winding are averaged about zero, so the DC component of the signals is lost. For signals having a rising leading edge such as signal 402, this does not cause a problem. However, for signals with a falling leading edge such as signal 404, it would be very difficult to define a suitable threshold level Vth as shown by signal 408. So, this solution involves not only an expensive transformer, but also the use of complex circuitry to detect the timing and length of the pulses.

If a small, low cost transformer T is used, which inherently has a poor low frequency transmission, signals such as signals 410 and 412 shown in FIG. 4C are received. If these signals are used with a simple comparator 38, the information contained in the length of positive-going pulses is lost. In addition, a delay is introduced in detecting negative-going pulses, since the trailing edge of the pulse is detected instead of the leading edge. Thus, this solution is also unsuitable for solving the current problem unless complex and expensive comparison circuits are used.

SUMMARY OF THE INVENTION

An object of the present invention is to provide a circuit for transmitting signals with a wide frequency spectrum over a cable, whereby the DC component of the signals is maintained, no deformation of the signal occurs, and the transmission is free from voltage spikes.

A further object of the present invention is to provide such a circuit which may be used without modifying the existing circuitry of the signal transmitter, nor the signal receiver.

A further object of the invention is to provide a cable carrying many conductors, including at least one conductor carrying a pulse signal, whereby the pulse signal applied to one end of the cable may be retrieved at the other end of the cable without deformation, DC offset or induced noise.

To achieve these objectives, the present invention provides a circuit for transmitting signals having a wide frequency spectrum over a cable. The signal transmission circuit includes an isolating transformer having a primary winding which is referenced to a ground voltage of the transmitting end and has a high-pass filtering function; a low-pass filter referenced to a ground voltage of a receiving end of the cable and having an input that is common with the input of the high pass filter; and means for summing the voltages at output nodes of the high pass filter and the low pass filter.

According to an embodiment of the current invention, the cut-off frequencies of the high pass filter and the low pass filter are substantially equal.

According to an embodiment of the current invention, a first conductor within the cable is connected, at a receiving end, by a first resistor to a terminal of the primary winding of the transformer. The other terminal of the primary winding is connected by a second conductor to a ground terminal of the transmitting end of the cable. The first conductor is connected by a second resistor and a capacitor to the ground terminal of the receiving end of the cable. A node between the second resistor and the capacitor is connected through a secondary winding of the transformer to an input of the receiving circuit.

According to an embodiment of the present invention, the circuitry of the invention is contained within at least one connector of the cable.

BRIEF DESCRIPTION OF THE DRAWINGS

These and other objects, characteristics and advantages of the present invention will become apparent from the following description of embodiments of the present invention, given by way of example with reference to the accompanying drawings, wherein:

FIG. 1 shows a conventional signal transmission circuit;

FIG. 2 shows a voltage-time plot of a synchronization pulse according to conventional signal transmission circuits;

FIG. 3 shows a variant of a signal transmission circuit illustrated in FIG. 1;

DETAILED DESCRIPTION

Figure 4A:
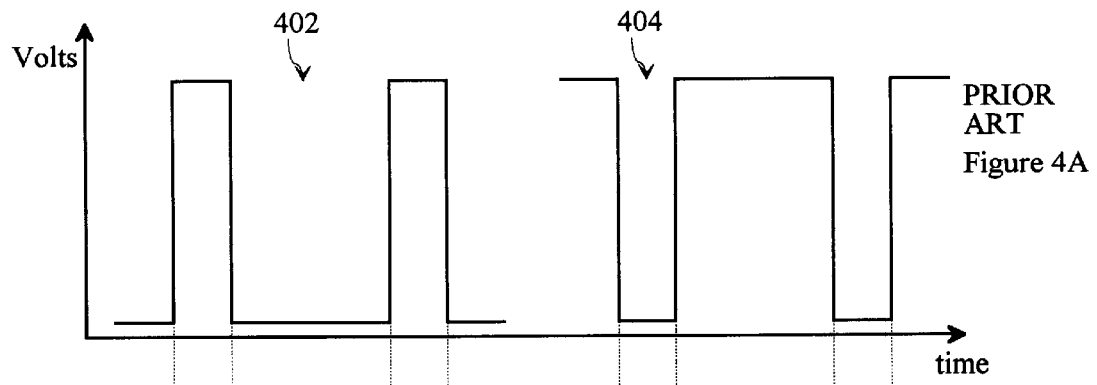
FIG. 4A shows exemplary line synchronization signals having rising and falling leading edges.
Figure 4B:
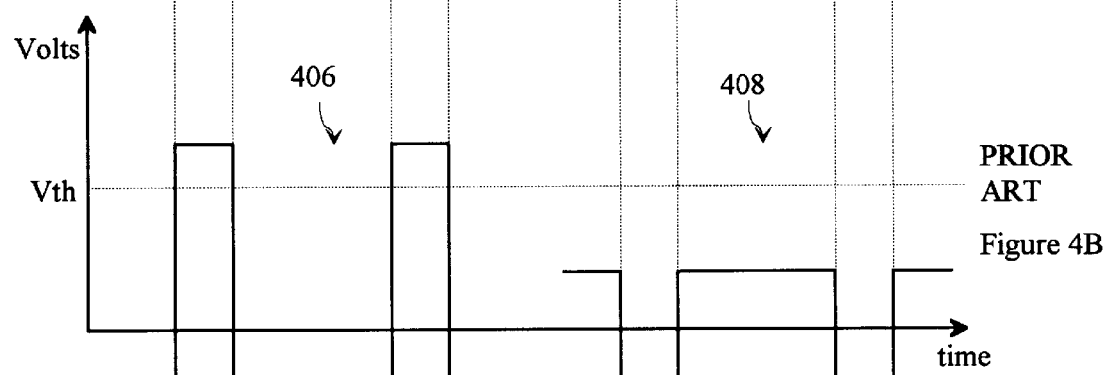
FIGS. 4B and 4C show synchronization pulse signals received from different types of transformers implemented in the conventional signal transmission circuit of FIG. 3.
Figure 4C:
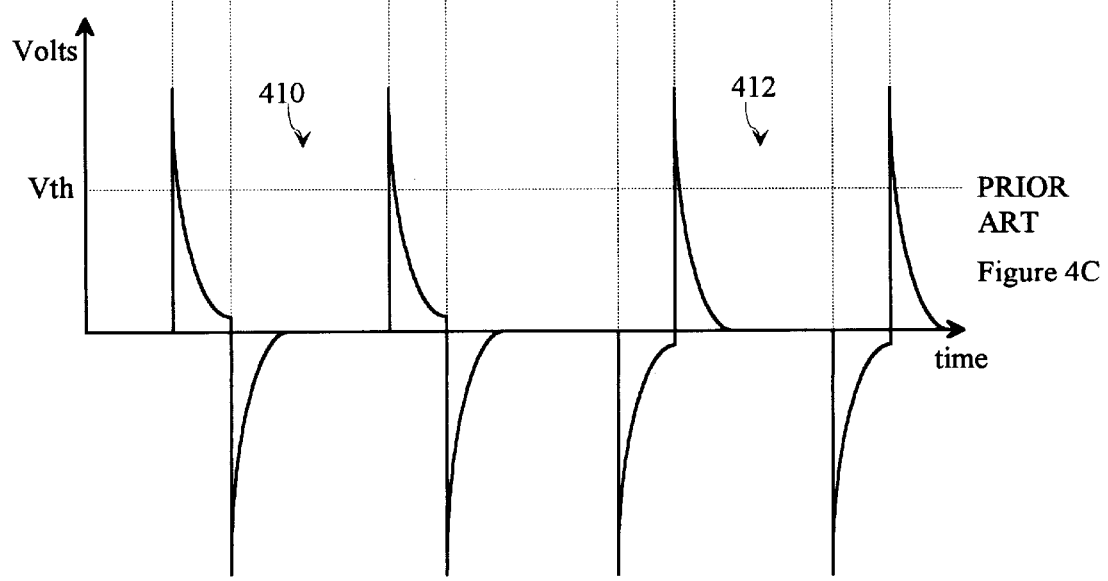
Figure 5:
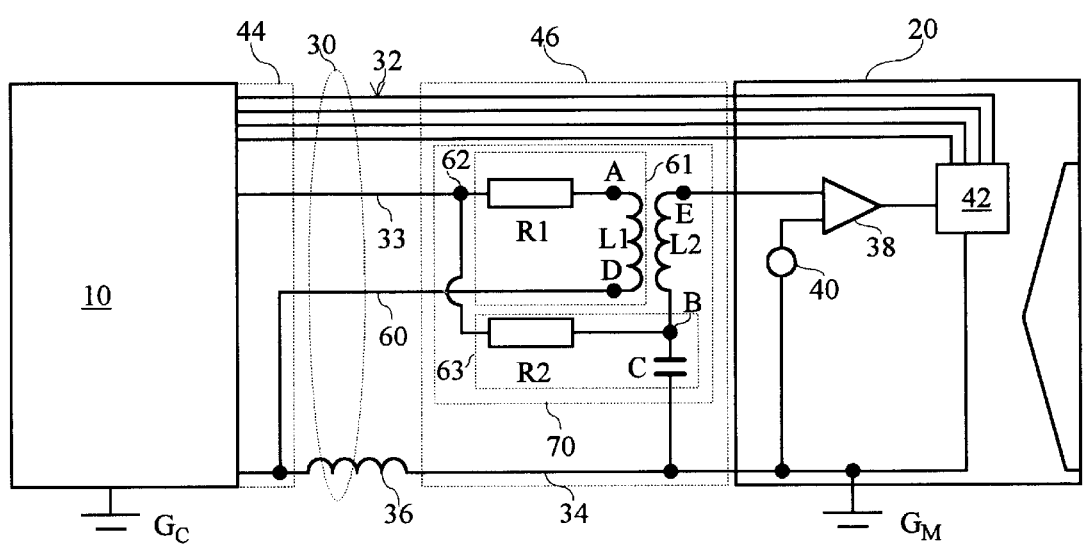
FIG. 5 shows a preferred embodiment of the signal transmission circuit according to the present invention.

FIG. 5 shows one preferred embodiment of the signal transmission circuit of the present invention. Features common to those illustrated in FIG. 1 carry identical reference labels.

The conductor 33 carrying transmitted signals from computer 10 is connected through a resistor R1 to a first terminal A of a first inductor L1. Terminal D of the first inductor L1 is connected to the ground $G_C$ of the computer 10 through a conductor 60 within cable 30. The conductor 33 is also connected through a second resistor R2 to a node B between a capacitor C and a first terminal B of a second inductor L2. The other terminal of the capacitor C is connected to the ground voltage $G_M$ of the monitor 20. The second terminal E of the second inductor L2 is connected to the first input terminal of the comparator 38.

The two inductors L1 and L2 have a high coupling factor. Preferably, they are two windings of a transformer wound onto a common core. In such a case, the coupling factor is almost unity, and the efficiency of such a transformer approaches 100%. The ground voltage $G_C$ of the computer and the ground voltage $G_M$ of the monitor are still connected by the conductor 34 having parasitic inductance 36.

According to a feature of the invention, the transmitted signal is split into a high frequency component and a low frequency component. Resistor R1 and inductor L1 may be considered to be a high pass filter, referenced to the ground voltage $G_C$ of the computer 10, by a conductor 60. This filter 61 has as an input node a first terminal 62 of resistor R1, a ground node D at the ground voltage $G_C$ and an output node A located between the resistor R1 and the inductor L1.

Resistor R2 and capacitor C may be considered to be a low pass filter 63 referenced to the ground voltage $G_M$ of the monitor 20. The filter 63 has an input node 62 at the first terminal of the resistor R2, a ground node at the ground voltage $G_M$ and an output node B between the resistor R2 and the capacitor C.

For ease of description, it is assumed that the inductors L1 and L2 have equal inductance. Preferably, inductors L1 and L2 are perfectly coupled. This will result in a voltage VL2 across the secondary coil L2 that is always equal to a voltage VL1 across the primary coil L1. Assuming a voltage step is transmitted along the conductor 33, which corresponds quite well to the form of line synchronization pulses, the voltage present at the output node A of the high pass filter 61 is VA=Vi.exp(-R1.t/L1), where Vi is the step voltage applied to conductor 33, R1 is the resistance of resistor R1, L1 is the inductance of inductor L1, and t is the time elapsed since the arrival of the voltage step.

Similarly, the voltage at the output node B of the low pass filter 63 is VB=Vi(1-exp(-t/(R2.C))), where R2 is the resistance of resistor R2, and C is the capacitance of capacitor C.

Since the second inductor L2 is perfectly coupled to the first inductor L1, and they are of the same value, the voltages VL1 and VL2 across the two windings L1, L2 of the transformer are equal. Since VL1=VL2, it follows that VE=VL2+VB=VA+VB, where VE is the voltage at the node E, referenced to the ground voltage $G_M$ of the monitor 20.

For this signal VE to be identical to the transmitted synchronization pulse Vi, the synchronization pulse Vi must be equal to the sum of the voltage VB at the output of the low pass filter 63 and the voltage VA at the output of the high pass filter 61 independently of time. That is: Vi=VA+VB. This yields:

$$Vi=Vi.\exp(-R1.t/L1)+Vi(1-\exp(-t/(R2.C))).$$

This condition is fulfilled if: R1/L1=1/(R2.C).

That is, when the high pass filter 61 and the low pass filter 63 have the same cut-off frequency, the pulses transmitted by computer 10 over conductor 33 arrive without deformation at the terminal E of the comparator 38.

Furthermore, the received pulses are free from noise. This is evident for high frequency components of the transmitted signal, which are transmitted by the isolating transformer L1-L2 without intervention of voltages induced across inductance 36. This is also true for the low frequency components since they are transmitted by the low pass filter 63, which eliminates all parasitic voltage spikes.

Furthermore, if the values of resistors R1 and R2 are equal, the impedance of the circuit 70 seen by the computer 10 is equal to this resistance value, and is independent of frequency. This feature may be used to obtain cables 30 of a particular impedance value, and to avoid signal reflections at the receiving end of the cable.

Significantly, since the circuit 70 of the present invention requires a transformer L1-L2 only for carrying high frequency signals, this transformer may be small and inexpensive.

The components of the circuit 70 of the present invention (the transformer containing inductors L1, L2; capacitor C; resistors R1, R2) are preferably positioned as close as possible to the comparator 38. More preferably, and according to a particular embodiment of the invention, these added components are incorporated within the connector 46 as shown in figures. The connection between ground voltage $G_C$ of the computer 10 and conductor 60 may be made within connector 44. Suitable values for the components are: R1=R2=470 Ω, C=1.3 nF, and L1=L2=287 nH.

The present invention thus provides a circuit 70 for transmitting signals with a wide frequency spectrum over a cable 30, whereby the DC component of the signal is maintained, no deformation of the signal occurs, and the transmission is free from voltage spikes.

The present invention also provides a cable 30 carrying many conductors 32, including at least one conductor 33 for carrying a pulse signal, wherein the pulse signal applied to one end of the cable 30 may be retrieved at the other end of the cable without deformation, DC offset or noise induced by signals in other conductors contained in the cable. Advantageously, this result is obtained without modification to the transmitting and receiving circuits connected by the cable, but only by modifying the cable (by adding a conductor 60), and modifying a connector at an end of the cable, possibly within the plug connected to the cable, or the socket which receives the plug.

Although described with regard to a specific application to cables for connecting a computer to a monitor, or interconnecting printed circuit boards, the circuit of the invention may be used in any domain where it is necessary to transmit signals having a wide frequency spectrum over a cable with high accuracy, but where high frequency noise may be introduced in the cable.

Although discussed as a signal receiving circuit, the circuit 70 according to the present invention may be installed on the transmitting end of the cable, with the added conductor 60 in the cable 30 being connected to the ground of the receiving circuit.

Other equivalent circuits could be used to replace isolation transformers, having a simple high pass filter and a simple low pass filters, such as the resistor-capacitor filters described.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A circuit for transmitting signals having a wide frequency spectrum over a cable from a transmitting end to a receiving end, the circuit comprising:

an isolating transformer having a primary winding including first and second terminals, said primary winding comprising a part of a high pass filter, said high pass filter having a first input node, a first output node, and being referenced to a ground voltage of the transmitting end;

a low-pass filter referenced to a ground voltage of the receiving end and having a second input node and a second output node, said second input node connected to said first input node; and means for summing voltages at said first and second output nodes, to produce a signal at the receiving end.

2. The circuit according to claim 1, wherein said high pass filter and said low pass filter have substantially equal cut-off frequencies.

3. The circuit according to claim 1, wherein the circuit is contained within at least one connector of the cable.

4. The circuit according to claim 2, wherein the circuit is contained within at least one connector of the cable.

5. A method for transmitting signals having a wide frequency spectrum over a cable from a transmitting end to a receiving end, comprising the steps of:

transmitting the signals referenced to a ground voltage of the transmitting end;

applying the signals concurrently to a high pass filter referenced to the ground voltage of the transmitting end, and to a low pass filter referenced to a ground voltage of the receiving end, thereby dividing each of the signals into a high frequency component and a low frequency component;

isolating said high frequency component to generate an isolated high frequency component; and adding said isolated high frequency component to said low frequency component to form a single transmitted signal referenced to said ground voltage of the receiving end.

6. The method of claim 5, wherein said step of isolating said high frequency component includes the step of applying said high frequency component to an inductor coupled to said high pass filter.

7. The method of claim 6, wherein said high pass filter includes a first resistor connected to a first terminal of a primary winding of said isolating transformer, said isolating transformer having a second terminal connected to said ground voltage of the transmitting end, said high pass filter having an output at said connection of said first resistor and said primary winding.

8. The method of claim 6, wherein said adding step comprises the step of applying said low frequency component generated by said low pass filter to a secondary winding of said transformer, said secondary winding having a third terminal connected to a conductor at the receiving end of the cable, and a fourth terminal connected to an output of said low pass filter; and coupling said secondary winding to said primary winding such that a voltage across said secondary winding is substantially equivalent to a voltage across said primary winding.

9. A cable for transmitting signals having a wide frequency spectrum from a transmitting end to a receiving end of the cable, comprising:

a plurality of signal carrying conductors for carrying a predetermined number of signals from the transmitting end to the receiving end of the cable;

a ground return conductor for connecting a ground voltage of the transmitting end of the cable to a ground voltage of the receiving end of the cable; and a signal transmission circuit, including,
an isolating transformer including,
a primary winding having first and second terminals, said second terminal connected to said ground voltage of the transmitting end, and a secondary winding having third and fourth terminals, said third terminal connected to a conductor at the receiving end of the cable, a first resistor having fifth and sixth terminals, said fifth terminal connected to said first terminal of said primary winding and said sixth terminal connected to said at least one of said plurality of signal carrying conductors, and a low pass filter having an input coupled to said sixth terminal of said first resistor and to at least one of said plurality of signal carrying conductors, and an output connected to said fourth terminal of said secondary winding.

10. The cable according to claim 9, further comprising:

a transmission circuit connected to said transmission end of said cable, said transmission circuit including said ground voltage of said transmission end.

11. The cable according to claim 10, further comprising:

a receiving circuit connected to said receiving end of said cable, said receiving circuit including said ground voltage of said receiving end.

12. The cable according to claim 11, wherein said transmission circuit is a computer and wherein said receiving circuit is a monitor.

13. The cable according to claim 9, wherein said primary winding and said secondary winding are highly coupled.

14. The cable according to claim 13, wherein said primary winding and said secondary winding have a coupling factor substantially equal to unity.

15. The cable according to claim 9, wherein said primary and secondary windings have substantially equal inductances.

16. The cable according to claim 15, wherein said inductance is approximately 287 nH.

17. A circuit for transmitting signals having a wide frequency spectrum over a cable from a transmitting end to a receiving end, the circuit comprising:

an isolating transformer including,
  a primary winding having first and second terminals, said second terminal connected by a conductor to a ground terminal of a transmitting end of the cable, and
  a secondary winding coupled to said primary winding and having third and fourth terminals;
a low pass filter referenced to a ground voltage of the receiving end of the cable and having a first input node and a first output node;
a first resistor connecting a first conductor of the cable and said first input node of said low pass filter to said first terminal of said primary winding, wherein said first resistor and said primary winding form a high pass filter referenced to a ground voltage of the transmitting end and having a second output node at said first terminal of said primary winding; and
means for summing voltages at said first and second output nodes, to produce a signal at the receiving end.

18. The circuit according to claim 17, wherein said low pass filter comprises:

a second resistor and a capacitor, connected to each other in series, said second resistor connected to said first input node of said low pass filter and said capacitor connected to a ground of the receiving end of the cable, wherein said first output node of said low pass filter is interposed between said second resistor and said capacitor and connected to said fourth terminal of said secondary winding.

19. The circuit according to claim 18, wherein the circuit is contained within at least one connector of the cable.

20. The circuit according to claim 17, wherein the circuit is contained within at least one connector of the cable.

21. The circuit according to claim 17, wherein said high pass filter and said low pass filter have substantially equal cut-off frequencies, and further wherein the circuit is contained within at least one connector of the cable.

22. A cable for transmitting signals having a wide frequency spectrum from a transmitting end to a receiving end of the cable, comprising:

a plurality of signal carrying conductors for carrying a predetermined number of signals from the transmitting end to the receiving end of the cable;

a ground return conductor for connecting a ground voltage of the transmitting end of the cable to a ground voltage of the receiving end of the cable; and a signal transmission circuit, including,
  an isolating transformer having,
    a primary winding having first and second terminals, said second terminal connected to said ground voltage of the transmitting end, and
    a secondary winding having third and fourth terminals, said third terminal connected to a conductor at the receiving end of the cable,
  a low pass filter having an input coupled to said first terminal of said primary winding and to at least one of said plurality of signal carrying conductors and an output connected to said fourth terminal of said secondary winding, and
  a first resistor having a fifth terminal connected to said first terminal of said primary winding and a sixth terminal connected to said at least one of said plurality of signal carrying conductors and to said input of said low pass filter, wherein said first resistor and said primary winding form a high pass filter.

23. The cable according to claim 22, wherein said low pass filter comprises:

a second resistor having seventh terminal connected to said input of said low pass filter and an eighth terminal connected to said output of said low pass filter; and a capacitor interposed between said eighth terminal of said second resistor and said ground voltage of the receiving end of the cable.

24. The cable according to claim 23, wherein said first resistor and said second resistor have substantially equal resistance values.

25. The cable according to claim 24, wherein said resistance value is approximately 470 ohms.

26. The cable according to claim 25, wherein said capacitor has a capacitance of approximately 1.3 nF.

27. The cable according to claim 24, wherein said signal transmission circuit is contained within at least one connector of the cable.

28. The cable according to claim 27, wherein said connector containing said signal transmission circuit is located in said receiving end of said cable, and wherein said cable further comprises:

a supplementary conductor connected to said ground voltage of the transmitting end of the cable and to said second terminal of said primary winding.

29. The cable according to claim 27, wherein said connector containing said signal transmission circuit is located in said transmitting end of said cable, and wherein said cable further comprises:

a supplementary conductor connected to said ground voltage of the receiving end of the cable and to said capacitor of said low pass filter.

30. The cable according to claim 27, wherein said high pass filter and said low pass filter have substantially equal cut-off frequencies.

* * * * *